J. S. KAUFMAN.
AUTOMATIC CAMERA TRIP.
APPLICATION FILED MAY 31, 1917.
1,260,908.
Patented Mar. 26, 1918.
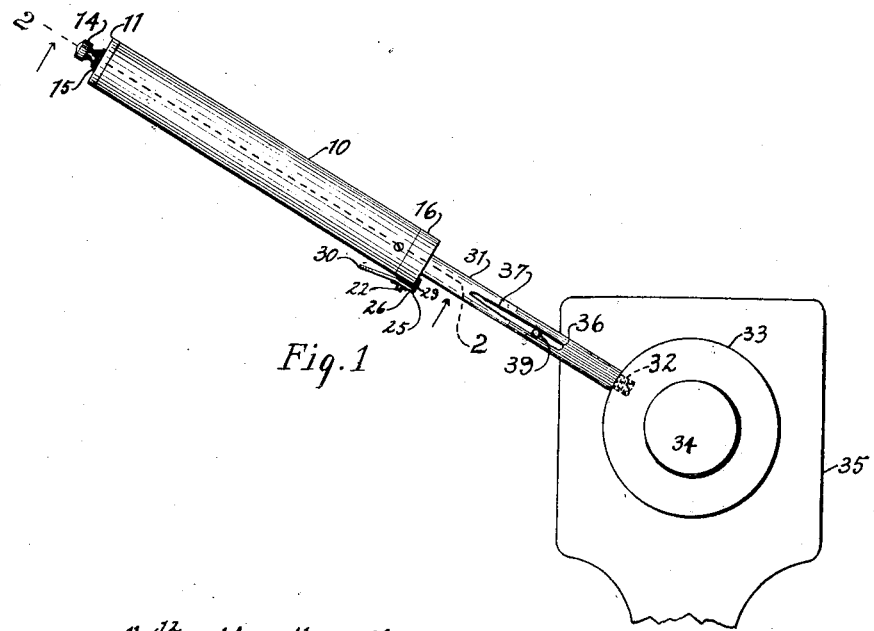
Fig. 1
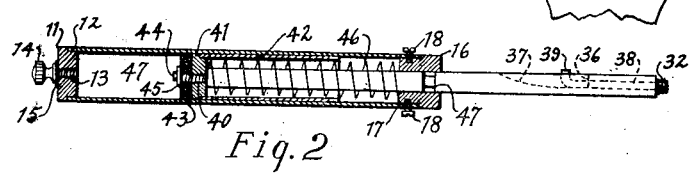
Fig. 2
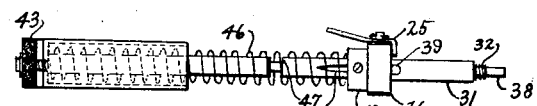
Fig. 3
Fig. 5
Fig. 4
INVENTOR
Joseph S. Kaufman
BY
John W. Klarley.
ATTORNEY

UNITED STATES PATENT OFFICE.

JOSEPH S. KAUFMAN, OF BALTIMORE, MARYLAND, ASSIGNOR TO ALLIANCE PRODUCTION CORPORATION, A CORPORATION OF NEW YORK.

AUTOMATIC CAMERA-TRIP.

1,260,908.   Specification of Letters Patent.   Patented Mar. 26, 1918.

Application filed May 31, 1917. Serial No. 171,941.

*To all whom it may concern:*

Be it known that I, JOSEPH S. KAUFMAN, a citizen of the United States, residing at Baltimore, in the State of Maryland, have invented certain new and useful Improvements in Automatic Camera-Trips; and I do hereby declare the following to be a full, clear, and exact description of the invention, such as will enable others skilled in the art to which it appertains to make and use the same.

My invention relates to automatic camera trips.

One object of my invention is to produce an automatic mechanism which shall trip the camera shutter at a predetermined interval of time after the instant in which the automatic mechanism is set in motion.

Another object of my invention is to produce a mechanism which shall be simple, cheap in construction and reliable in operation.

These and further objects of my invention will become apparent in the following specification, in which reference is had to the accompanying drawings, of which:—

Figure 1 is the front view of a camera equipped with my improved device.

Fig. 2 is a section of the cylinder and piston of my improved device taken along the line 2—2 of Fig. 1 looking in the direction of the arrows.

Fig. 3 is a detail view of the piston rod, cylinder cap, trigger and push pin.

Fig. 4 is a central section through the cylinder cap showing the construction of the trigger.

Fig. 5 is a perspective view of the trigger finger lever.

In the drawings, 10 is the body of the cylinder of my improved camera trip and it is formed of any suitable metallic tube, the interior surface of which is smooth.

The rear end of the body 10 is closed by the cap 11 which has a reduced portion 12 that fits snugly in the interior of the body 10 and is soldered therein.

The cap 11 is provided with a central threaded hole in which is screwed the threaded end 13 of the adjusting screw 14. A leather washer such as 15 is placed between the inner shoulder of the adjusting screw 14 and the outer surface of the cap 11.

The front end of the body 10 is closed by the cap 16, the latter being provided with a reduced portion 17 which fits snugly on the interior of the body 10 and is retained in place therein by the screws 18—18, the latter passing through holes in the body 10 and being threaded into the cap 16. The cap 16 is provided with a central hole 19 and with a hole 20 which extends diametrically nearly through the large portion of the cap 16 and with another hole 21 smaller than the hole 20 but axially in line therewith, which extends from the outside of the enlarged portion of the cap 16 to the end of the hole 20.

The trigger is formed of the trigger stud 22 provided with an enlarged head 23 and a spring 24 serves to press the head 23 toward the axis of the hole 19, for a purpose hereinafter described. The head 23 is guided in the hole 20 and the portion 22 is guided in the hole 21. The trigger lever 25 is provided with a flat portion 26 having the hole 27 therein, which hole fits over the trigger stud 22, and the pin 28 passed through the stud 22 prevents the trigger lever 25 from displacement thereon. The trigger lever 25 is provided with a portion 29 at right angles to the portion 26 and the portion 29 extends over the front of the cap 16 and thus prevents the trigger lever 25 from turning to any great extent on the trigger stud 22. The trigger lever 25 is provided with the bent portion 30 for the application of the fingers as hereinafter described.

The piston rod 31 slides freely in the hole 19 provided in the cap 16; said piston rod is provided with a threaded portion 32 which is adapted to be screwed into the hole that is usually provided in the side of the camera lens casing 33 for the reception of the usual hand tripping device.

The camera lens is shown at 34 and the front of the camera is shown at 35.

The piston rod 31 is provided with a central hole extending from the end of the threaded portion 32 to the beginning end 36 of the slot 37 and the pin 38 slides freely in said hole. The pin 38 is provided with a portion 39 at right angles thereto which slides freely in the slot 37.

The rear end of the piston rod 31 is provided with a threaded portion 40 on which is screwed the cap 41 which is soldered to the piston 42. A leather washer such as 43 rests against the cap 41 and is secured in place by the nut 44 and washer 45. An extension spring 46 extends between the inner faces of the caps 16 and 41 for a purpose hereinafter explained.

A groove such as 47 is provided in the piston rod 31 for a purpose hereinafter explained.

The operation of my improved automatic camera trip is as follows:—

The end 32 is to be screwed into the usual hole, the fingers are to be applied to the cap 16 and the latter is to be pulled back toward the left, as shown in Fig. 1 until the head 23 of the trigger stud 22 enters the slot 47 of the piston rod 31. The entering of the head 23 into the slot 47 is caused by the pressure of the spring 24.

When the head 23 enters the slot 47, the cap 16 will be supported in the position on the piston rod 31 shown in Fig. 1, against the pressure of the spring 46, and the pin 38 will be in the position shown in Fig. 2.

Any group that is to be photographed can then be arranged and the plate put in the camera for the exposure.

If now the operator desires to become a member of the group to be photographed, he applies his finger to the end 30 of the trigger lever 25 and presses same toward the body 10. When the end 30 moves in toward the body 10, the trigger stud 22 and head 23 are pulled outwardly, thus removing the latter from the groove 47 in the piston rod 31 and the pressure of the spring 46 moves the body 10 and cap 16 toward the portion 39 of the pin 38, then the cap 16 strikes the portion 39 and moves said portion from the position shown in Figs. 1 and 2 to that shown in Fig. 3, thus moving the front end of the pin 38 outwardly beyond the end of the threaded portion 32 and causing it to operate the tripping mechanism of the camera.

The swiftness of this movement is determined by the air pressure between the inner surface of the cap 11 and the leather washer 43. The body 10 and cap 16 thus move slowly toward the portion 39 of the pin 38 and when the latter is moved by the cap 16 the front end of the pin 38 is moved inwardly and operates the camera shutter. Thus time is provided for the operator to pose in the group.

When it is desired to increase the time during which the cap 16 moves from the position shown in Fig. 1 to that shown in Fig. 3, this can be accomplished by turning the adjusting screw 14 so as to clamp the leather washer 15 more tightly against the cap 11 and thus decrease the amount of leak from the chamber 48.

To increase the speed of said movement, the adjusting screw 14 is to be slightly released.

The construction and operation of the camera shutter being old and well-known in the art has not been illustrated or described.

I claim:—

1. In an automatic camera trip, the combination with a camera lens casing comprising a threaded hole, a shutter and trip therefor, of a piston rod having a threaded end screwed in said hole, a push rod mounted in said piston rod, a piston mounted on the free end of said piston rod, a cylinder sliding upon said piston, a cap for said cylinder sliding upon said piston rod, and a spring mounted between said cap and said piston.

2. In an automatic camera trip, the combination with a lens casing comprising a threaded hole and containing a shutter and trip therefor, of a piston rod having one end screwed in said hole, a push rod mounted in said end of said piston rod, a piston mounted on the other end of said piston rod, a cylinder sliding upon said piston, a cap for said cylinder sliding upon said piston rod, a groove in said piston rod and a bent end on said push rod extending into the path of said cap.

In testimony whereof, I affix my signature.

JOSEPH S. KAUFMAN.

Copies of this patent may be obtained for five cents each, by addressing the "Commissioner of Patents, Washington, D. C."